(12) United States Patent
Dieffenderfer et al.

(10) Patent No.: US 7,698,536 B2
(45) Date of Patent: Apr. 13, 2010

(54) METHOD AND SYSTEM FOR PROVIDING AN ENERGY EFFICIENT REGISTER FILE

(75) Inventors: James Norris Dieffenderfer, Apex, NC (US); Thomas Andrew Sartorius, Raleigh, NC (US); Jeffrey Todd Bridges, Raleigh, NC (US); Michael Scott McIlvaine, Raleigh, NC (US); Gregory Christopher Burda, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 11/201,542

(22) Filed: Aug. 10, 2005

(65) Prior Publication Data

US 2007/0038826 A1    Feb. 15, 2007

(51) Int. Cl.
*G06F 9/00* (2006.01)
(52) U.S. Cl. ...................................... 712/216; 712/218
(58) Field of Classification Search ......... 712/208–213, 712/216–219; 711/100, 101, 154–156, 163
See application file for complete search history.

(56) References Cited

U.S. PATENT DOCUMENTS 4,891,753 A * 1/1990 Budde et al. ................ 712/217
5,014,237 A   5/1991 Masters et al.
5,802,339 A   9/1998 Sowadsky et al.
2002/0184431 A1  12/2002 Kumar et al.
2006/0277425 A1* 12/2006 Renno et al. ................ 713/323

FOREIGN PATENT DOCUMENTS

RU          94036231          7/1994

OTHER PUBLICATIONS

Tseng, Jessica; "Energy Efficient Register File Design"; 1999.*
International Search Report-PCT/US06/031295, International Search Authority-European Patent Office-Jun. 1, 2007.
Written Opinion-PCT-US06/031298, International Search Authority-European Patent Office-Jun. 1, 2007.
International Preliminary Report on Patentability-PCT/US06/031296, the International Bureau of WIPO, Geneva Switzerland-Feb. 12, 2008.
Tseng, "Energy Efficient Register File Design", 1999.

* cited by examiner

*Primary Examiner*—Alford W Kindred
*Assistant Examiner*—Benjamin P Geib
(74) *Attorney, Agent, or Firm*—Nicholas J. Pauley; Peter M. Kamarchik; Sam Talplatsky

(57) ABSTRACT

A register file is disclosed. The register file includes a plurality of registers and a decoder. The decoder may be configured to receive an address for any one of the registers, and disable a read operation to the addressed register if data in the addressed register is invalid.

21 Claims, 2 Drawing Sheets

METHOD AND SYSTEM FOR PROVIDING AN ENERGY EFFICIENT REGISTER FILE

BACKGROUND

1. Field

The present disclosure relates generally to register files, and more specifically, to methods and systems for providing energy efficient register files.

2. Background

An embedded processor design typically includes temporary storage such instruction caches, data caches and register files, etc. These storage components are relatively small, high speed memories that increase the speed of the processor by reducing the number of times the processor has to access slower external memory. Unfortunately, these storage components tend to consume a lot of power due to the switching capacitive loads. Larger components tend to switch more capacitive loads than smaller components, and therefore, consume more power. For example, after instruction and data caches, register files that are used as general purpose registers typically tend to consume more power than most of the other smaller components in an embedded processor design.

When an instruction is executed, appropriate source operands are first retrieved from the corresponding register file(s). After the instruction has been executed, results, if any, are written back into the register file(s). However, before these results are written back into the register file(s), one or more of these results are often needed for a subsequent instruction as a source operand and are thus taken by a forwarding network for further processing. The longer the pipeline the more likely that the source operands will be delivered to the forwarding network instead of the register file; furthermore, the more often the results are taken by the forwarding network, the longer the corresponding register file(s) have to wait before they are updated with the latest data. One ramification is that invalid data remain in the register file(s) for longer periods of time. If subsequent read operations are performed on register file(s) having invalid data, such read operations would produce incorrect results if used for instruction execution. In addition, power expended on such operations would be wasted. Hence, it would be desirable to provide an energy efficient means to prevent invalid read operations.

SUMMARY

A register file is disclosed. The register file includes a plurality of registers, and a decoder configured to receive an address for any one of the registers, and disable a read operation to the addressed register if data in the addressed register is invalid.

Another register file is disclosed. The register file includes a plurality of registers, means for receiving an address for any one of the registers, and means for disabling a read operation to the addressed register if data in the addressed register is invalid.

A method of accessing a register file having a plurality of registers includes receiving an address for one of the registers, and disabling a read operation to the addressed register in response to the data in the addressed register being invalid.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
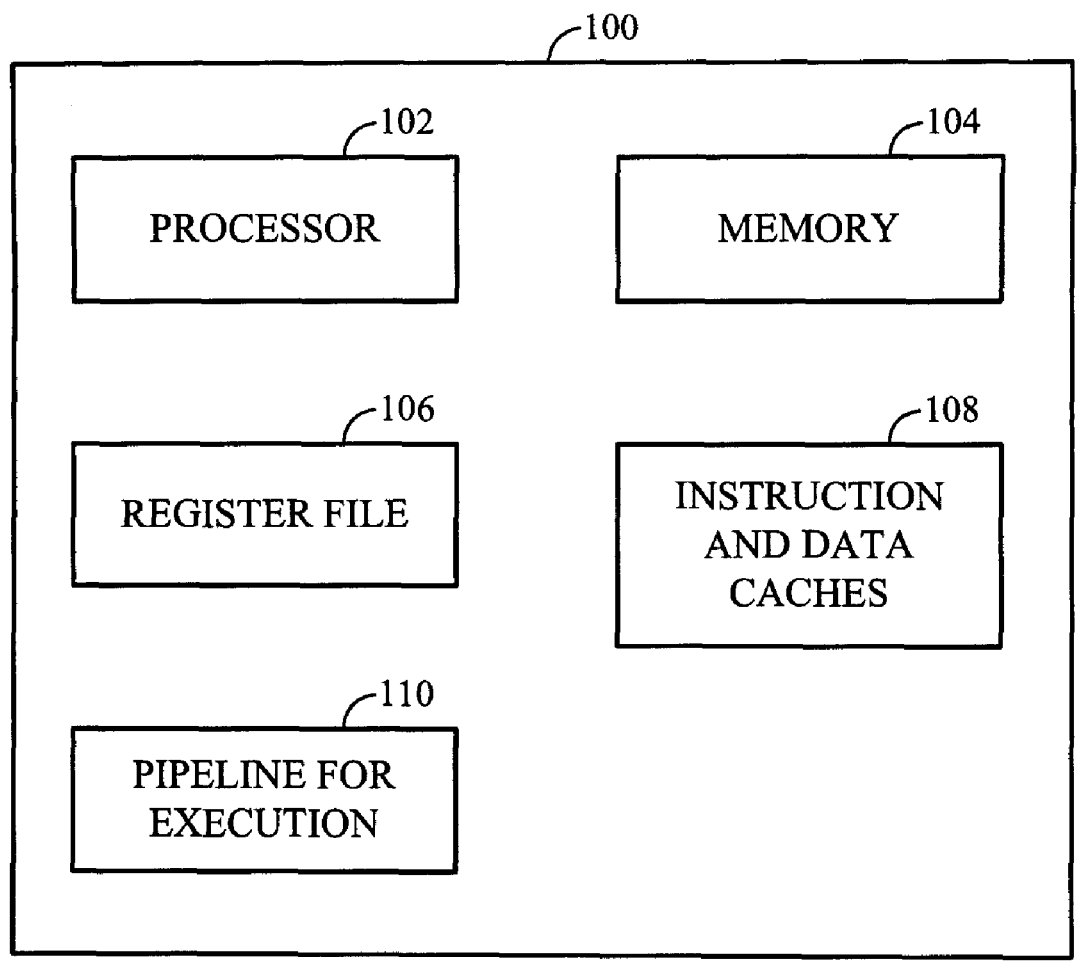
FIG. 1 is a simplified block diagram illustrating a system having an energy efficient register file according to the present disclosure.

FIG. 1 is a conceptual block diagram illustrating an example of a data processing system 100, capable of processing, retrieving and storing information. The data processing system 100 may be a stand-alone component, or alternatively, embedded in a device such as a mobile telephone, PDA, PC, laptop, digital camera, game console, or any other suitable device. The data processing system 100 may include a processor 102, such as a microprocessor, a digital signal processor, a video graphics processor, or any other suitable processor. The data processing system 100 may also include memory 104, which holds the program instructions and data needed by the processor 102 to perform its functions.

The processor 102 may be configured as a pipeline processor. Instruction and data caches 108 may also be provided for storage of the most recently accessed instructions and data. A register file 106 may be provided to store operands that are needed by the pipeline 110 for the execution of instructions. When an instruction is to be executed, the source operands for such instruction can be retrieved from the register file 106 and then used in the pipeline 110 to execute the instruction. Upon completion of the instruction, any results may then be written back into the register file 106 to be used as source operands for subsequent instructions, or provided to a forwarding network for further processing. The processor 102 may also include peripheral devices, or any other types of devices that handle computational processes or data movement.

Figure 2:
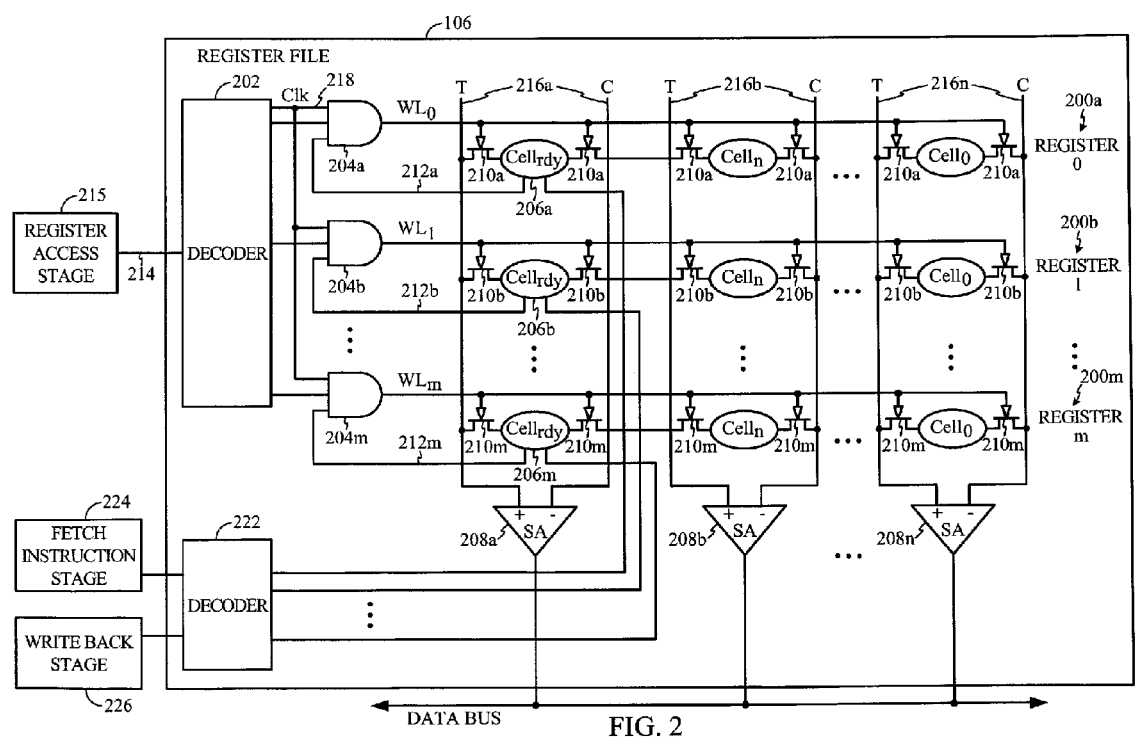
FIG. 2 is a simplified block diagram illustrating one embodiment of an energy efficient register file according to the present disclosure.

FIG. 2 is a schematic block diagram illustrating an example of how the processor accesses its internal register file. The register file 106 may include a number of registers 200a-m. Each register 200 may be used to store data. Such data can be used as an operand for an instruction. The register file 106 may also include a number of other components including, for example, a decoder 202, and logic devices 204a-m. The decoder 202 and logic devices 204a-m are shown in FIG. 2 to illustrate the manner in which the processor reads from the register file. The circuitry required to write to the cells is well known in the art, and therefore, is not shown.

Each of the registers 200a-m may include a number of cells 0-rdy, and a number of switches 210 a-m. The internal circuitry and logic details of the 0-rdy are well known in the art, and therefore, will not be discussed any further. The switches are shown as field effect transistors (FET), but may be any type of suitable switches. Two switches are used with each cell to couple the stored bit and its complement to a pair of differential bit-lines 216a-216n when its register is enabled. The registers may be enabled through their corresponding logic devices 204a-204m. The logic devices 204a-204m are used to generate an enable signal on one of the word lines $WL_0$-$WL_m$ which select the corresponding register. The logic devices 204a-204m are implemented in FIG. 2 with AND functionality, but may be implemented in any suitable manner. An operand-ready signal 212a-212m from each cell 206a-m may be provided as an input to its corresponding logic device 204a-m. The use of the operand-ready signal 212a-m will be further described below. A clock signal 218 may also be provided as an input to the logic devices 204a-m to control their activation based on circuit timing. Since only one register is selected at a time, the differential bit lines for each bit position of the multiple registers may share the same sense amplifier. The sense amplifiers 208a-208n provide an output based on its corresponding differential bit lines.

The operations of the register file 106 is further described as follows. On a read operation, a register file address 214 is provided to the decoder 202 from a register access stage 215 in the processor pipeline. The decoder 202 activates the target register by providing the appropriate control signal to the corresponding logic device. The logic device corresponding to the target register also receives, as an input, an ready signal 212a-m from one of the cells associated with the target register. The logic device uses the state of the ready signal 212a-m to determine whether to enable the cells associated with the target register. Depending on the state of the ready signal, the logic device may then enable the target register by connecting the target register cells to the differential bit lines through their respective switches, thereby allowing data contained in the cells to be read out via the sense amplifiers 208a-n.

Each of the registers 200a-m may include a number of cells 0-rdy, and a number of switches 210a-m. The internal circuitry and logic details of the cells 0-rdy are well known in the art, and therefore, will not be discussed any further. The switches are shown as field effect transistors (FET), but may be any type of suitable switches. Two switches are used with each cell to couple the stored bit and its complement to a pair of differential bit-lines 216a-216n when its register is enabled. The registers may be enabled through their corresponding logic devices 204a-204m. The logic devices 204a-204m are used to generate an enable signal on one of the word lines $WL_0$-$WL_m$ which select the corresponding register. The logic devices 204a-204m are implemented in FIG. 2 with AND functionality, but may be implemented in any suitable manner. An operand-ready signal 212a-212m from each cell 206a-m may be provided as an input to its corresponding logic device 204a-m. The use of the operand-ready signal 212a-m will be further described below. A clock signal 218 may also be provided as an input to the logic devices 204a-m to control their activation based on circuit timing. Since only one register is selected at a time, the differential bit lines for each bit position of the multiple registers may share the same sense amplifier. The sense amplifiers 208a-208n provide an output based on its corresponding differential bit lines.

The state of the ready signal 212 can be controlled in a number of ways. For example, the ready signal 212 can be switched to an "off" state to indicate that data is not valid when an instruction that will update that register is fetched by the pipeline, and to an "on" state to indicate that data is valid when the data resulting from the execution of that write instruction has been written back into the register.

An example of a methodology to update the ready signal is shown in FIG. 2. A decoder 222 may be configured to provide a "set" and "reset" signal to the cell in each register holding the ready signal. In this example, the "set" signal is used to switch the ready signal to the "on" state, and the "reset" signal is used to switch the ready signal to the "off" state. The polarities may be different in other embodiments depending on the word line $WL_X$ gating logic. The decoder 222 may be controlled from various stages within the pipeline depending on the particular application and the overall design constraints. In at least one embodiment of the processor, ready signal is "reset" when a write instruction is fetched by the pipeline. That is, the address of the register file for the write instruction, along with a "reset" control signal, is provided to the decoder 222 from a fetch instruction stage 224 in the pipeline. Once the write instruction works its way through the pipeline and reaches the write back stage 226, the address of the register file and a "set" control signal can be provided to the decoder 222. This causes the decoder to "set" the ready signal in the register file.

Another methodology for updating the ready signal is to use the bit lines 216a in a manner similar to how other cells are written. Based on the disclosure and teachings provided herein, a person of ordinary skill in the art will appreciate how to use the appropriate logic, circuits and/or other components to implement the operand-ready signal 212 according to the present disclosure.

When the state of the operand-ready signal 212 indicates that data stored in the target register is not valid, the corresponding logic device is gated off (i.e., the corresponding word line $WL_X$ output from the logic does not activate the switches associated with the target register). As a result, the bit lines 216a-n are prevented from switching which, in turn, means the sense amplifiers 208a-n are also prevented from switching. Therefore, data stored in the target register is not outputted via the sense amplifiers 208a-n.

The following is an example further illustrating operations of the register file 106. It is assumed that the register file address identifies the register 200a for a read operation pursuant to an instruction. The decoder 202 decodes such information and sends the appropriate control signal to the logic device 204a to indicate that the register 200a has been targeted for the read operation. Other control signals are also sent by the decoder 202 to the other logic devices 204b-m to indicate that the other registers 200b-m are not needed for this particular read operation.

The logic device 204a also receives an operand-ready signal 212a from one of the cells 206a associated with the register 200a. If the operand-ready signal 212a indicates that data in the register 200a is not valid, the logic device 204a is gated off, i.e., the logic device 204a outputs a control signal on the word line $WL_0$ that prevents the switches 210a from switching on. As a result, the bit lines 216a-n are not switched and data stored in the cells 0-rdy are not outputted via the sense amplifiers 208a-n. Alternatively, if the operand-ready signal 212a indicates that the data stored in the register 200a is valid, the logic device 204a outputs a control signal on the word line $WL_0$ that turns on the switches 210a. As a result, the data from the target register 200a is placed on the bit lines 216a-n and outputted from the register file 106 via the sense amplifiers 208a-n.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A processor comprising:
   a register file comprising:
      a plurality of registers, each register comprising a plurality of memory cells, each register including a first one of the plurality of memory cells of the register to store a not-ready signal when data in the register is not valid and to store a ready signal when the data in the register is valid, and a remainder of the memory cells of the register to store the data in the register; and
      logic configured to receive a first address of a target register selected from the plurality of registers, the logic responsive to a signal stored in a first memory cell of the target register to selectively disable the target register output when the signal stored in the first memory cell of the target register is a not-ready signal and to enable the target register output when the signal stored in the first memory cell of the target register is a ready signal.

2. The processor of claim 1, wherein the logic is further configured to generate an enable signal in response to the received first address and to gate the enable signal with the signal stored in the first memory cell of the target register to produce a signal to disable or enable the target register output according to whether the signal stored in the first memory cell of the target register is a ready signal or a not-ready signal.

3. The processor of claim 2, wherein the logic is further configured to gate the enable signal with the signal from the first memory cell of the target register via an AND function.

4. The processor of claim 1, wherein the logic is further configured to receive a second address associated with a second target register, and to provide access to second data stored in the second target register when the second data is valid.

5. The processor of claim 1, wherein when a write instruction is detected in a pipeline coupled to the processor, prior to execution of the write instruction, the data stored in the target register is determined to be invalid.

6. The processor of claim 1, further comprising a plurality of sensing amplifiers, wherein each of the plurality of sensing amplifiers is configured to sense an output provided by a corresponding pair of differential bit lines, wherein each of the differential bit lines is coupled to each of a plurality of cells via a corresponding switch and each of the plurality of cells resides in one of the plurality of registers.

7. The processor of claim 1, wherein at least two of the plurality of registers share a common sense amplifier.

8. The processor of claim 1, wherein the logic is configured to generate a target register enable signal in response to receiving a target register address and to gate the target register enable signal with the signal stored in the first memory cell of the target register.

9. The processor of claim 1, wherein data in the target register is invalid when a result of execution of an instruction to be written to the target register has not yet been stored in the target register.

10. A processor, comprising:
    a register file comprising:
       a first register including a first ready cell and a first plurality of memory cells comprising N memory cells, the first register configured to enable outside access to data stored in the first plurality of memory cells in response to receiving a first enable signal;
       a second register including a second ready cell and a second plurality of register memory cells comprising N memory cells, the second register configured to enable outside access to data stored in the second plurality of memory cells in response to receiving a second enable signal;
       a plurality of sensing amplifiers, wherein each sensing amplifier is configured to sense an output of a memory cell of the first register or a memory cell of the second register via selectable switches;
       a first logic device coupled to the first register via a first word line, the first logic device configured to provide the first enable signal to the first register via the first word line in response to receiving a first control signal at a first input of the first logic device and in response to receiving a first ready signal at a second input of the first logic device;

a second logic device coupled to the second register via a second word line, the second logic device configured to provide the second enable signal to the second register via the second word line in response to receiving a second control signal at a first input of the second logic device and in response to receiving a second ready signal at a second input of the second logic device;

a first decoder configured to provide the first control signal to the first input of the first logic device in response to receiving a first register address associated with the first register, and further configured to provide the second control signal to the first input of the second logic device in response to receiving a second register address associated with the second register; and a second decoder configured to provide a ready signal to the first ready cell when data in the first register is valid and to provide a not-ready signal to the first ready cell when data in the first register is not valid.

11. The processor of claim 10, wherein when the first decoder provides the control signal to a first input of the first logic device, and when the second decoder provides a ready signal value to the first register, outside access to data stored in the first register is enabled.

12. The processor of claim 10, wherein the second decoder is configured to provide the not-ready signal to the first ready cell when a write instruction to the first register is in an instruction pipeline associated with the processor, and wherein the second decoder is configured to provide the ready signal after the write instruction to the first register has been executed.

13. The processor of claim 10, wherein each logic device is further configured to receive a clock signal, wherein the clock signal activates one of the plurality of logic devices during a clock cycle.

14. The processor of claim 10, wherein the ready signal provided to the first ready cell of the first register is also provided to the first logic device to gate the ready signal with the first enable signal.

15. A method of accessing a register file, the method comprising:

receiving an address of a first register of a plurality of registers, the first register having a first memory cell to store a ready signal and a plurality of remaining memory cells to store data;

storing a ready signal having a ready signal value of "set" in the first memory cell of the first register when data stored in the first register is valid and having the ready signal value of "reset" in the the first memory cell of the first register when the data stored in the first register is invalid;

disabling a read operation to the first register when a "reset" ready signal value is stored in the first memory cell of the first register; and enabling the read operation to the first register when a "set" ready signal value is stored in the first memory cell of the first register.

16. The method of claim 15, wherein each of the plurality of registers includes a corresponding first memory cell configured to store the "set" ready signal value or the "reset" ready signal value indicating whether the data stored in the corresponding register is valid or invalid.

17. The method of claim 15, further comprising changing the ready signal value stored in the first memory cell of the first register from the value of "reset" to "set" after a write instruction to the first register has been executed.

18. The method of claim 17, wherein the ready signal value stored in the first memory cell of the first register is changed before the address of the addressed first register is received.

19. The method of claim 15, further comprising providing the data stored in the first register to a forwarding network when the data stored in the first register is valid.

20. The method of claim 15, wherein the data is invalid when a write instruction to write new data to the first register is in an instruction pipeline associated with the register file, and the data is valid when there is no write instruction to write new data to the first register in the instruction pipeline.

21. The method of claim 15, wherein the method further comprises generating a register enable signal in response to receiving a register address and gating the register enable signal with the signal stored in the first memory cell of the first register.

* * * * *

UNITED STATES PATENT AND TRADEMARK OFFICE
CERTIFICATE OF CORRECTION

PATENT NO. : 7,698,536 B2
APPLICATION NO. : 11/201542
DATED : April 13, 2010
INVENTOR(S) : Dieffenderfer et al.

It is certified that error appears in the above-identified patent and that said Letters Patent is hereby corrected as shown below:

Column 6, line 4, claim 1: "the target register output" to read as --a target register output--

Signed and Sealed this
Twelfth Day of July, 2011

David J. Kappos
*Director of the United States Patent and Trademark Office*